(12) United States Patent
Jamali

(10) Patent No.: US 10,218,173 B2
(45) Date of Patent: Feb. 26, 2019

(54) AC/DC CONVERTER FOR FEEDING NON-LINEAR HIGH-POWER LOADS (E.G. ELECTROLYZERS) WITH REDUCING CURRENT HARMONICS

(71) Applicant: Javad Jamali, Tehran (IR)

(72) Inventor: Javad Jamali, Tehran (IR)

(73) Assignee: Javad Jamali, Tehran (IR)

( * ) Notice: Subject to any disclaimer, the term of this patent is extended or adjusted under 35 U.S.C. 154(b) by 0 days.

(21) Appl. No.: 15/489,786

(22) Filed: Apr. 18, 2017

(65) Prior Publication Data
US 2018/0302004 A1 Oct. 18, 2018

(51) Int. Cl.
H02J 3/01 (2006.01)
H02M 7/162 (2006.01)
H02M 1/08 (2006.01)
H02M 1/15 (2006.01)

(52) U.S. Cl.
CPC ............... *H02J 3/01* (2013.01); *H02M 1/08* (2013.01); *H02M 1/15* (2013.01); *H02M 7/1626* (2013.01)

(58) Field of Classification Search
CPC ...................................... H02M 1/12
See application file for complete search history.

(56) References Cited

U.S. PATENT DOCUMENTS

| 3,769,570 | A | * | 10/1973 | Stairs | H02M 7/162 363/3 |
| 6,166,513 | A | * | 12/2000 | Hammond | H02M 7/49 318/762 |
| 6,229,722 | B1 | * | 5/2001 | Ichikawa | H02M 7/10 363/71 |
| 6,340,851 | B1 | * | 1/2002 | Rinaldi | H01F 38/16 307/82 |
| 8,736,102 | B1 | * | 5/2014 | Gao | H02M 3/28 307/17 |
| 2002/0145890 | A1 | * | 10/2002 | Ainsworth | H02M 1/12 363/44 |
| 2006/0109701 | A1 | * | 5/2006 | Morcov | H02J 3/34 363/148 |
| 2008/0049468 | A1 | * | 2/2008 | Wei | H02M 5/458 363/71 |
| 2012/0274291 | A1 | * | 11/2012 | Ge | H02M 3/33523 323/267 |
| 2013/0070489 | A1 | * | 3/2013 | Zhang | H02M 5/45 363/36 |
| 2014/0016356 | A1 | * | 1/2014 | Furmanczyk | H02M 5/14 363/3 |
| 2015/0171741 | A1 | * | 6/2015 | Sastry | H02M 1/4233 363/40 |
| 2017/0240063 | A1 | * | 8/2017 | Herke | B60L 11/1811 |

* cited by examiner

Primary Examiner — Daniel Kessie
Assistant Examiner — David A Shiao

(57) ABSTRACT

A new converter is disclosed, for reducing current harmonics in three phase AC network, during the conversion of AC to DC for power supplying the high-power electrochemical and other non-linear apparatus.

10 Claims, 7 Drawing Sheets

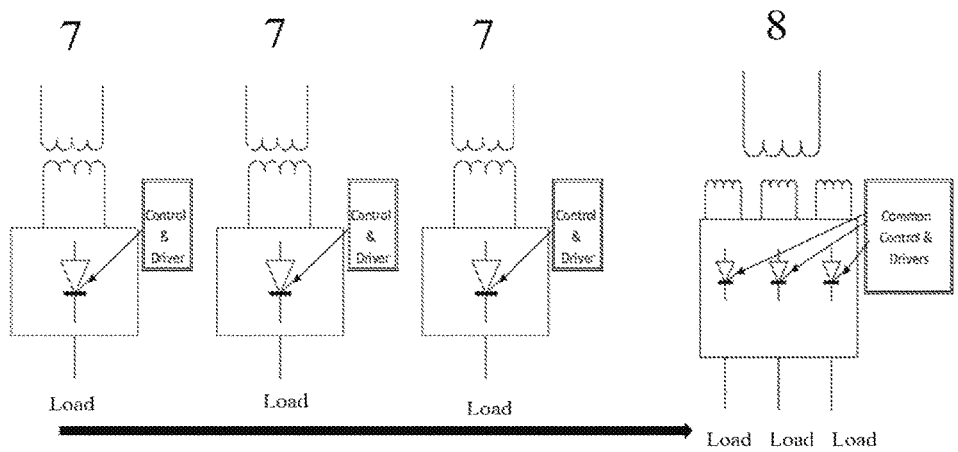
Fig 1a - Block Diagram
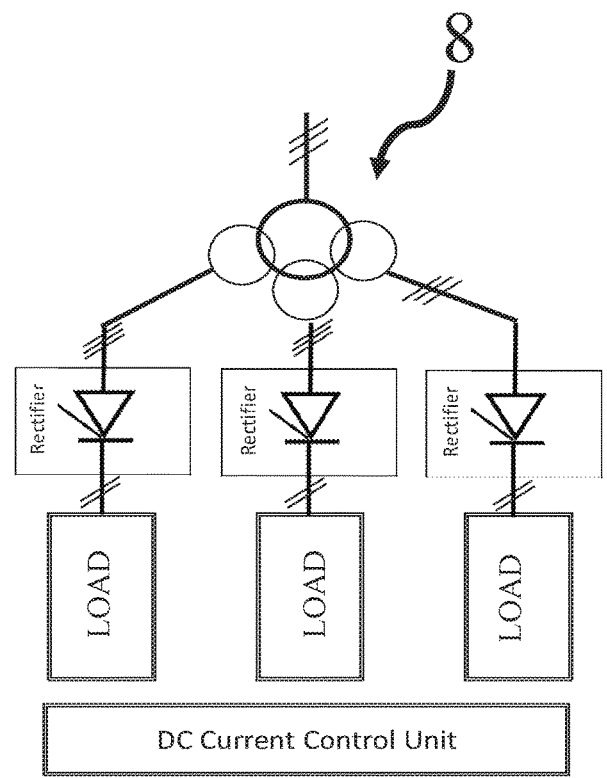
Fig 1b - Wiring Diagram

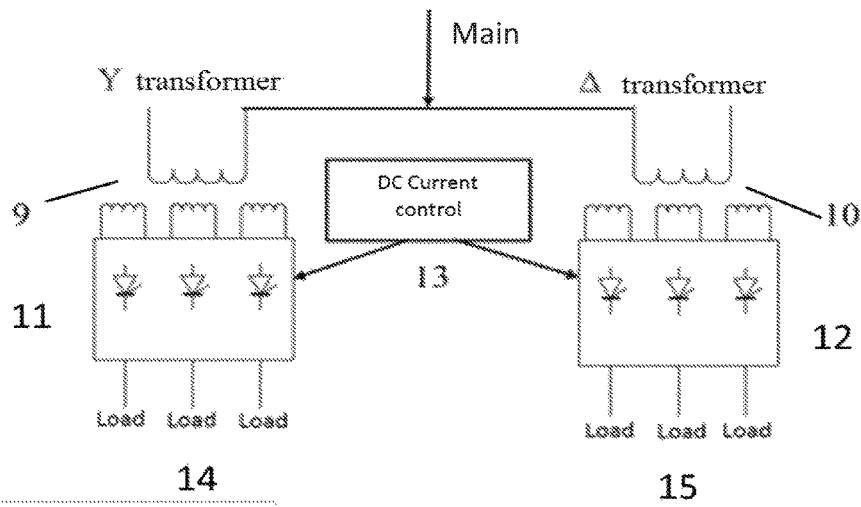
Fig 2a - Block Diagram
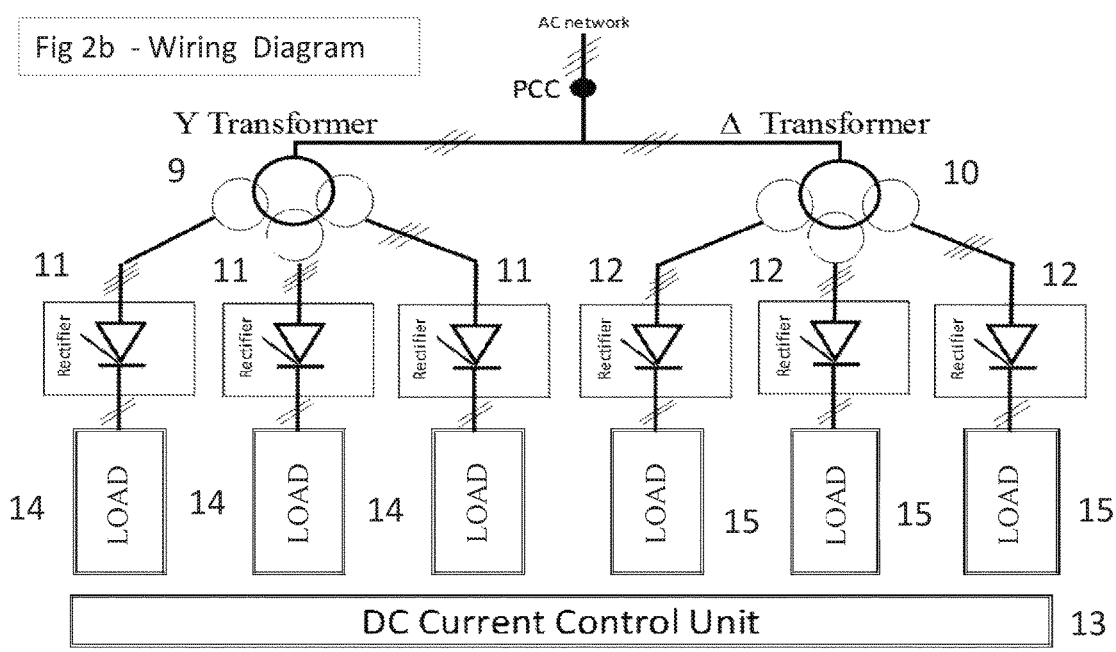
Fig 2b - Wiring Diagram

AC/DC CONVERTER FOR FEEDING NON-LINEAR HIGH-POWER LOADS (E.G. ELECTROLYZERS) WITH REDUCING CURRENT HARMONICS

BACKGROUND OF THE INVENTION

Power supply of non-linear loads includes; three major equipments; a Power transformer, a rectifier and an electrolyzer. Each of these three components, generate their specific harmonics and combination of the abovementioned harmonic sources in the electrochemical plant. Therefore this causes serious problems due to huge amount of DC current.

Harmonic is an unwanted phenomenon in electrical industry which causes various difficulties for consumers and power supply networks. Harmonic reduction at generating sources; is the basic and desired target for specialists; especially at high-power electrolyzer industries.

The harmful effects of harmonics can be described in the following categories: Firstly on power transformers, it causes overheating and consequently reduction in production. Secondly has an effect on upstream networks; which results in problems with the AC power supplier. Thirdly it has an effect on electrical equipment installed in plants, such as abnormal operation of motors.

The highest sources of harmonics generation, are the industries which apply AC to DC converters with a non-linear, high-rated power loads, since non-linear loads are also sources of harmonic generation. Various solutions are already applied for harmonic reduction. Some of them such as a harmonic filter, a PWM and a Multi-pulse rectifier are not perfectly applicable for high-power sources, and others such an OLTC are complicated and extremely expensive.

On the other hand survey of former inventions at aforementioned industries; shows that:
1) A harmonic filter has no effect on power transformer's overheating, and also has a probability of dangerous resonance.
2) A Multi-pulse rectifier requires complicated transformers, with high losses and is not suitable for high-power application.
3) Other techniques, which were useful for other applications, were not applicable for non-linear high-power loads.

In such situations and abstinence of techniques resolving the above issues and shortcomings, the present invention will be a remarkable solution. Also since the harmonic distortion of thyristors, still has their costs and problems; this condition led me to find a way for changing the future use of rectifiers in those industries; which suffer from huge amount of harmonics.

SUMMARY OF THE INVENTION

AN AC/DC converter to feed high-power electrochemical loads suffers from harmful effects of harmonics which are generated by rectifiers and an electrolyzer. The subject of the present invention is directed to a new and useful AC/DC converter for reducing the current harmonic. This will improve major problems which are affecting the recent electrochemical plants. Some of the solved problems are as follow:
a) Reduction in harmonics that are passing through the power transformers. This prevents the overheating of the transformers and provides production at a nominal capacity.
b) Reduction in the harmonics that are injected to upstream network; solving the need of harmonic filters.
c) Electrical power loss reduction, which reduces the production cost.

Brief technical description of the invention describes that any regular AC/DC converter consists of three major equipment; a power transformer, a rectifier and a load. Presented invention is based on combination of three regular converters together, in order to integrate their harmonics at specific conditions.

Harmonics, which are generated by various non-linear loads, are different. So any type of non-linear loads requires its specific solution, which is achieved by various configurations. Configuration specifies the hardware of the transformers, the hardware of the rectifiers and also the software of the control, which are necessary to achieve the desired harmonics.

Therefore the detail of the presented invention is not common for all types of loads. In the other word, presented invention is a customized converter and a tailor-made modular package.

It is known that a thyristor generates more harmonics during current control, therefore the presented new converter eliminates harmful effect of thyristor during current control. In the meantime thyristor-based rectifiers suffer from low power factors, in the present new converter; the power factor will be constant and acceptable, so that no power factor correction will be required.

BRIEF DESCRIPTION OF THE DRAWINGS

FIG. 1; Shows three regular rectifiers; each having its own current control

FIG. 2; Shows a schematic diagram of a "Modular Technique" including two transformers Y & Δ, each having three secondary winding, three rectifiers and three isolated loads.

ABBREVIATIONS

Figure 3:
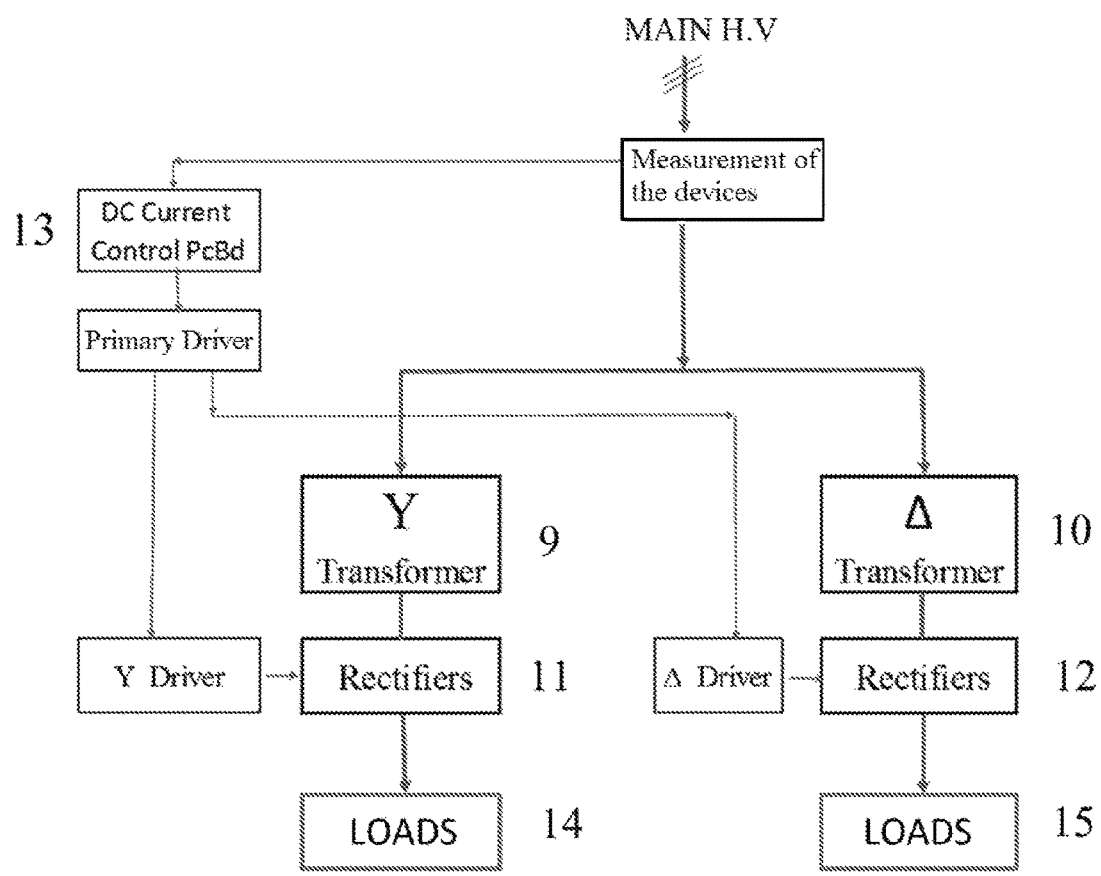
FIG. 3; Shows a block diagram of the "Modular technique" of the presented invention; where all the DC outputs are galvanicly isolated.

The following list describes the abbreviations used in the specification:
OLTC—On Line Tap Changer
PWM—Pulse Width Modulation
IHD—Individual Harmonic Distortion
THD—Total Harmonic Distortion
PCC—Point of Common Coupling (upstream contact)
CAME—Chlore Alkali Membrane Electrolyzer

ELEMENT NUMBERS

The following; lists all the element numbers present in the drawings:
1 Multi profile programmer
2 Profile selector
3 Total coarse control
4 Drivers
5 Main control
6 Individual fine control
7 Regular converter system
8 New converter system
9 New transformer in Yy connection row
10 New transformer in Y Δ connection row
11 New rectifiers in Yy connection row
12 New rectifiers in Y Δ connection row
13 Common DC current control
14 Three loads in Yy connection row
15 Three loads in Y Δ connection row

DETAILED DESCRIPTION

Each regular AC/DC converter (7, FIG. 1) consists of three major equipment; a power transformer, a thyristor-based rectifier and a load. The current invention is based on a combination of three regular converters together (8, FIG. 1).

A harmonic wave has a vector specification. In accordance with Fourier's Theorem, a harmonic current (corresponding to a harmonic wave) comprises a plurality of IHD current harmonics orders (e.g., 3, 4, 7, 9, 11, etc.) wherein each IHD current harmonic order of the plurality of IHD current orders corresponds to a sinusoidal wave (e.g., an amplitude of the sinusoidal wave may be positive, negative or zero). In some examples, a plurality of current harmonics (e.g., three current harmonics) may combine in the transformer, wherein equal IHD orders of the plurality of current harmonics are added together. Wherein equal IHD orders of the plurality of current harmonics comprise different values (e.g., a first negative value, a second positive value and/or a third zero value), an IHD amplitude associated a sum of the equal IHD orders may be mitigated (e.g., reduced). Thus, a combination of two or more current harmonics may result in a reduction of IHD and/or THD.

FIG. 1a shows a block diagram of a converter (8). FIG. 1b shows a wiring diagram of the converter (8) comprising a power transformer, three thyristor-based rectifiers and three isolated DC non-linear loads. All of the rectifiers' thyristors are controlled by a control program. The control is performed via conducting thyristors at specific moments. The control leads to a desired current curve and consequently, a desired current harmonic and amplitude.

Modular Technique:

One of the popular methods for reducing the harmonics in the high-power converters is; installation of two transformers side by side, one (e.g., a wye transformer) with a Y (also known as wye) connection and the other (e.g., a delta transformer) with a Δ (also known as delta) connection. FIG. 2a shows a block diagram of a combination of two Y & Δ rows. FIG. 2b shows a wiring diagram of the combination of two Y & Δ rows. The present invention uses this technique and employs a Y row and a Δ row for more harmonics reduction.

Finally, presented invention has two Y & Δ transformers (FIGS. 2; 9 and 10 respectively) each having three secondary winding, three bridge rectifiers (FIGS. 2; 11 and 12 respectively) and three loads (FIGS. 2; 14 and 15).

All the rectifiers (11 and 12) are under control of a "DC current control" (FIG. 2; 13). This package can be installed in the plant as a modular set. Any number of these modular sets can be installed in each plant.

Configuration

The current harmonic reduction of the non-linear loads is focused in this invention. Harmonics generated by the various non-linear loads are different, and so any type of the non-linear loads needs its specific solution, which is achieved by the configurations.

Figure 4:
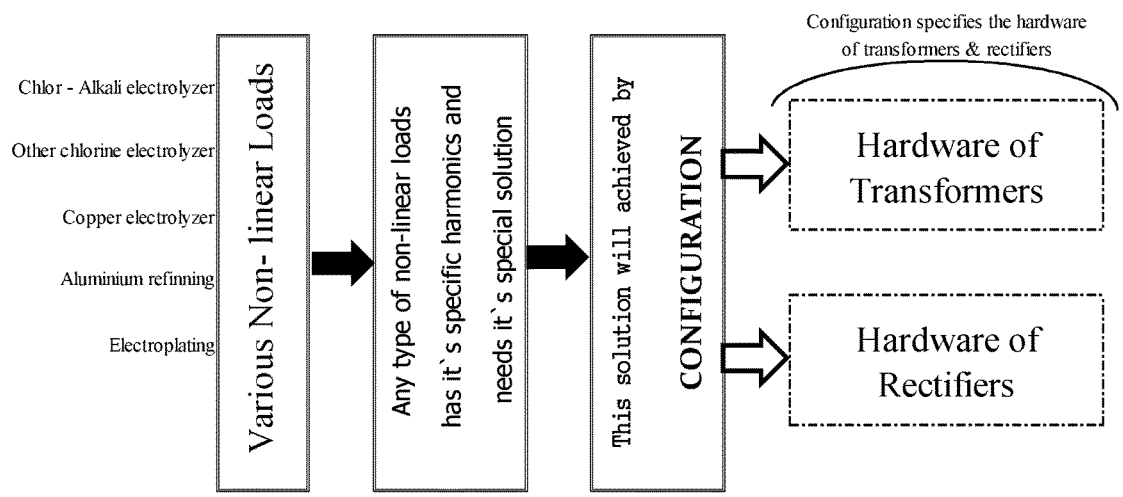
FIG. 4; Shows a diagram for the effect of loads' type to the configuration. Therefore any type of non-linear loads; need its specific solution, which we have applied by a configuration. This configuration determines the hardware of the transformers and the rectifiers.

The configuration determines the hardware of the transformers (9 and 10), the hardware of the rectifiers (11 and 12) and also the software of the control system (13), which are necessary to achieve the desired harmonics. FIG. 4 shows the relationship between the type of loads (14 and 15), the solution and the configuration.

Basics of the Current Control

The DC current in a non-linear load; controlled by a control unit (13) (also known as a controller); which is equipped with microcontrollers. This control unit is based on, multi-profile control and applies selected profile to the drivers of each rectifier at any required moment.

Figure 6:
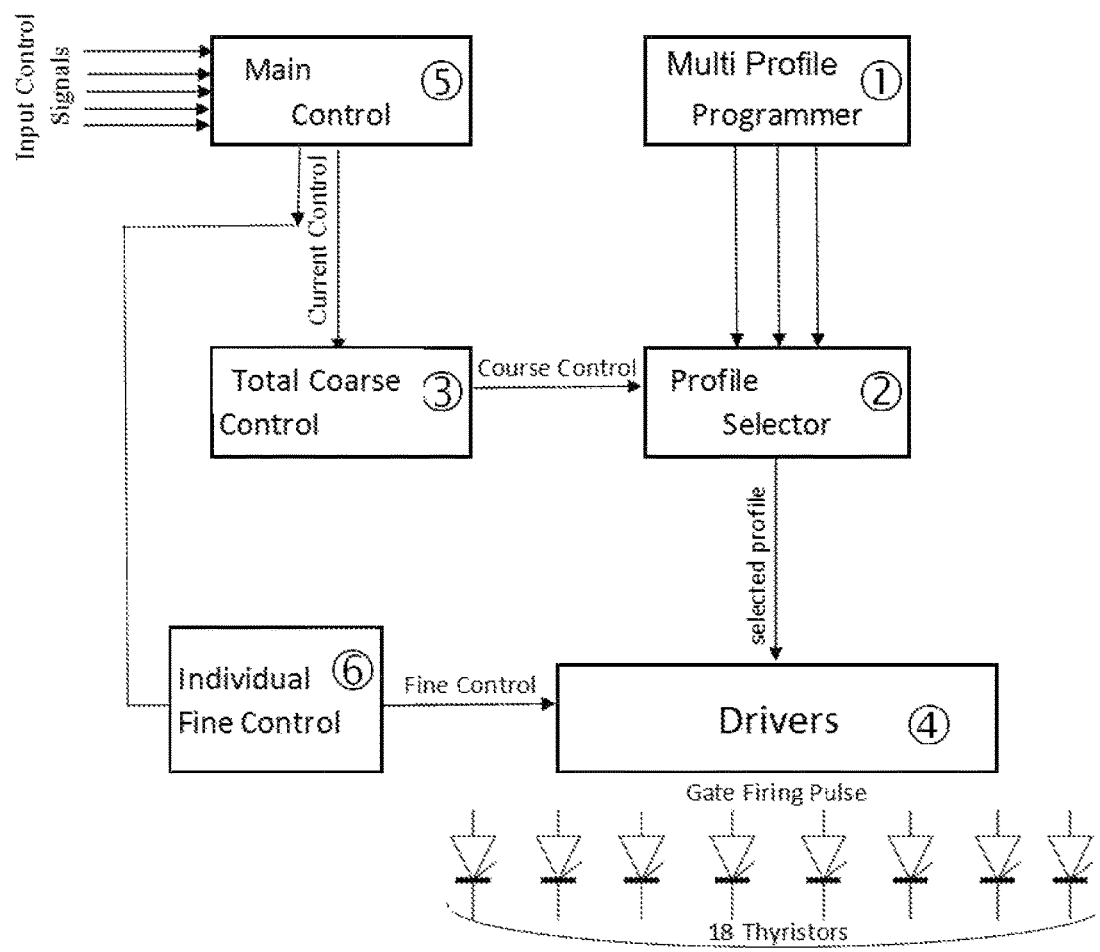
FIG. 6; Shows a block diagram of the current control; including a multi profile programmer, a profile selector and drivers, with the capability of individual and total current control.
Figure 7:
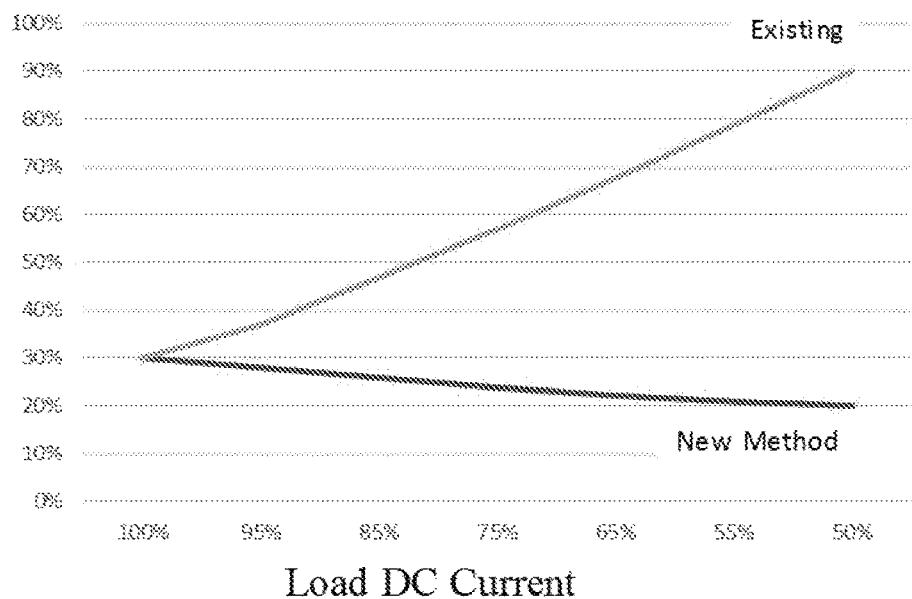
FIG. 7; displays a diagram of the calculated data for harmonics passing power transformer in CAME configuration; with a comparison between the existing and the future (new) method.
Figure 8:
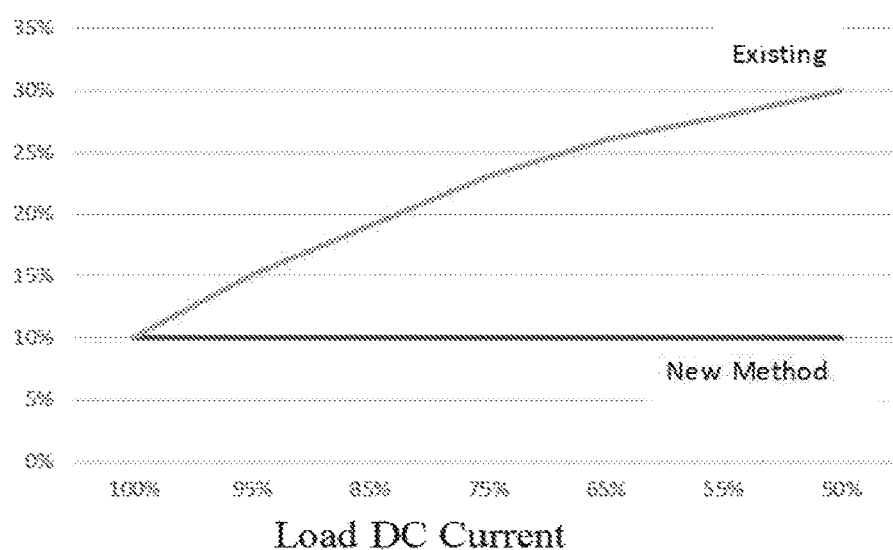
FIG. 8; Displays a diagram of the calculated data for harmonics injected to the upstream (PPC) in the CAME configuration; with a comparison between the existing and the future (new) method.
Figure 9:
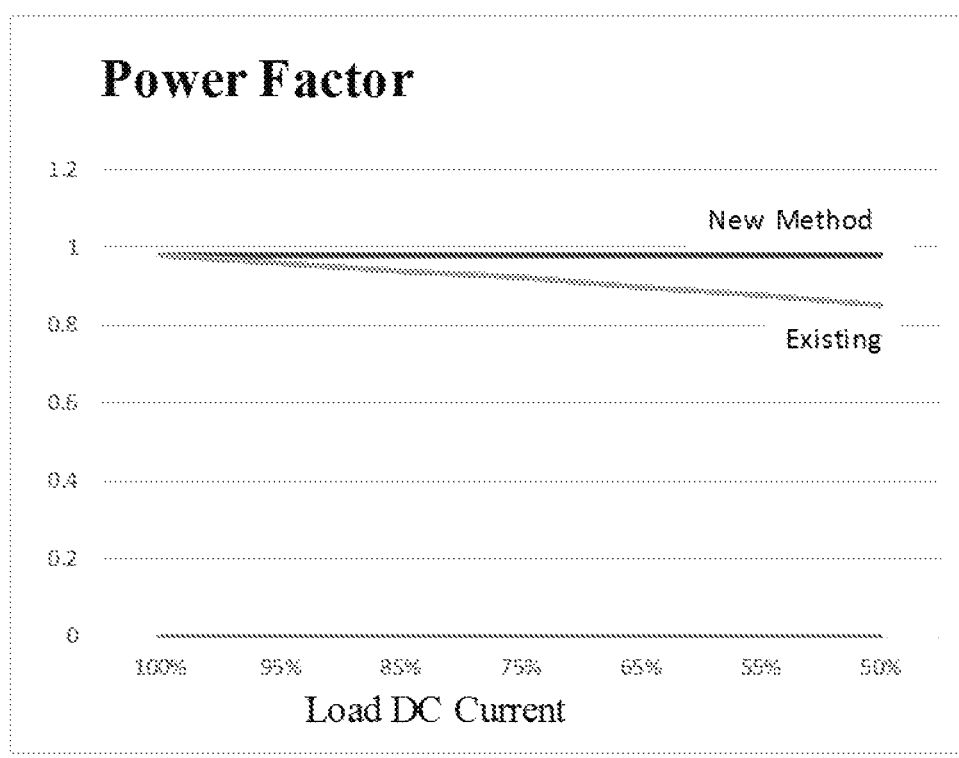
FIG. 9; Displays a Diagram of the calculated data for the power factor in the CAME configuration; with a comparison between the existing and the future (new) method.

The current control block diagram is shown in FIG. 6. The Multi profile programmer (1), generates the profiles. The profile selector (2), selects one of the available profiles according to a coarse control signal received from the total coarse control unit (3). The output signal of the profile selector (2); which we have named selected profile signal, controls the drivers (4). The drivers (4) submit (also known as transmit) trigger pulses for conducting of intended thyristors (18). The main control unit (5), receives input parameters such as $V_{ac}$, $I_{ac}$, $V_{dc}$, $I_{dc}$, desired data and/or other control signals. The consequence for current control (output of the main control unit); sends the current control signal to the total coarse control unit (3), which controls the currents of all the loads in the modular package/set as a coarse control signal.

The main control unit (5) also sends another signal to an individual fine control unit (6), which controls the current of any load separately as a fine control signal via drivers (4 of FIG. 6) of said modular set.

Figure 5:
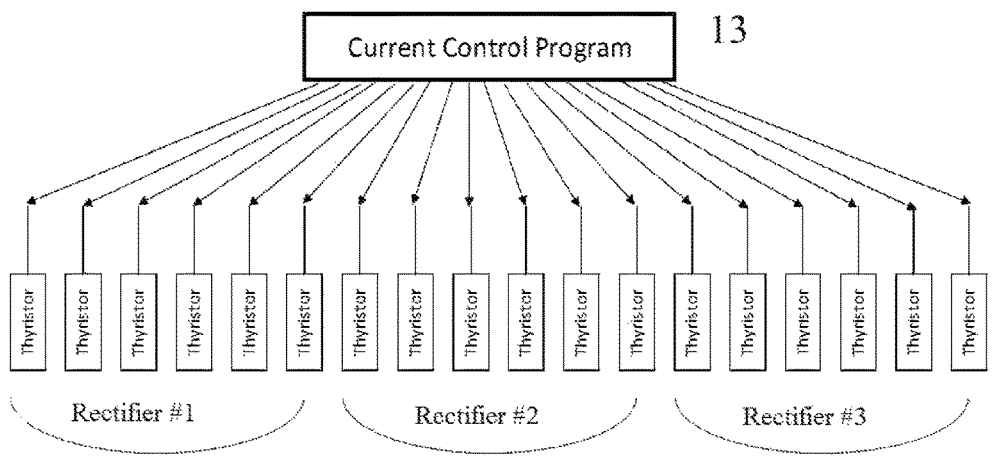
FIG. 5; Shows a control program which has all the thyristors under control; in order to shape the current curve, and consequently a favorite/desired current harmonics and also maintaining a desired DC current value.

Actually the current control program/unit has all of the thyristors under control, and is capable of conducting the thyristors at any required moment, in order to achieve the desired current curve and consequently the desired current harmonics. This is exactly the same as what a pianist does; where he/she has all the claviers under his fingers and at any required moment, plays some of them to create a favorite tone. FIG. 5, shows that all the thyristors are under control of the current control program (13).

Calculated Data

The present invention is based on the following three main features:

Reduction of harmonics passing through power transformers

Reduction of harmonics injected to a PCC

Power factor correction

As mentioned in the configuration chapter, all the parameters are dependent on the type of the non-linear load, so here we present calculated data for a specific load, Chlor-Alkali Membrane Electrolyzer (CAME).

Summing all the features of the present invention, the new converter is presented for reducing current harmonics in DC power supply to high-power non-linear loads; where THD at the power transformer is reduced. Consequently overheating of the power transformer is prevented. THD at PCC is reduced and will be approximately constant. Therefore extra harmonic injections, to the main upstream network, are prevented. Since any types of non-linear loads have their own specific harmonics, new converter have specific configurations for each type of non-linear load. Configuration specifies/determines both the hardware and the software. The power factor will be about 0.97. Therefore no capacitors are required for power factor correction. Also no harmonic filter is required. The heat loss in the rectifiers will be equal to the existing condition and all of the DC outputs to loads are galvanic isolated.

It is important to point out that none of the following methods are applied in the present invention:

Pulse Width Modulation (PWM), Multi-pulse or multi-phase rectifiers, any self-inductive or capacitor for harmonic reduction.

It should also be noted that the invention is not limited to the best modes explained and exemplary features described here, and can be configured and designed to cover a wide range of power circuits.

The invention claimed is:

1. A modular alternating current (AC) to direct current (DC) converter system, comprising:
    a wye transformer, comprising a first set of secondary windings, wherein the first set of secondary windings comprises three secondary windings per each phase of a three-phase AC network;
    a first set of three bridge rectifiers, wherein:
        each bridge rectifier of the first set of three bridge rectifiers is connected to windings of the first set of secondary windings; and
        each bridge rectifier of the first set of three bridge rectifiers supplies a DC current to a respective load;
    a delta transformer, comprising a second set of secondary windings, wherein the second set of secondary windings comprises three secondary windings per each phase of the three-phase AC network;
    a second set of three bridge rectifiers, wherein:
        each bridge rectifier of the second set of three bridge rectifiers is connected to windings of the second set of secondary windings; and
        each bridge rectifier of the second set of three bridge rectifiers supplies a DC current to a respective load; and
    a controller configured to control each bridge rectifier of the first set of three bridge rectifiers and the second set of three bridge rectifiers in order to:
        control a DC current passing through each bridge rectifier of the first set of three bridge rectifiers such that a summation of current harmonics, generated by each bridge rectifier of the first set of three bridge rectifiers, at the wye transformer is reduced; and
        control a DC current passing through each bridge rectifier of the second set of three bridge rectifiers such that a summation of current harmonics, generated by each bridge rectifier of the second set of three bridge rectifiers, at the delta transformer is reduced.

2. The modular AC to DC converter system of claim 1, wherein:
    the wye transformer comprises a first set of primary windings, wherein the first set of primary windings comprises a single primary winding per each phase of the three-phase AC network;
    the delta transformer comprises a second set of primary windings, wherein the second set of primary windings comprises a single primary winding per each phase of the three-phase AC network; and
    the first set of primary windings and the second set of primary windings are connected to the three-phase AC network.

3. The modular AC to DC converter system of claim 1, comprising a plurality of sets of thyristors, wherein:
    each bridge rectifier of the first set of three bridge rectifiers comprises a set of thyristors of the plurality of sets of thyristors; and
    each bridge rectifier of the second set of three bridge rectifiers comprises a set of thyristors of the plurality of sets of thyristors.

4. The modular AC to DC converter system of claim 3, wherein each set of thyristors of the plurality of sets of thyristors comprises six thyristors.

5. The modular AC to DC converter system of claim 3, the controller configured to control the plurality of sets of thyristors in order to:
    control a shape of a DC current curve corresponding to each bridge rectifier of the first set of three bridge rectifiers and the second set of three bridge rectifiers.

6. The modular AC to DC converter system of claim 5, wherein:
    a set of current harmonics are generated by each bridge rectifier of the first set of three bridge rectifiers and the second set of three bridge rectifiers based upon a shape of a DC current curve corresponding to the bridge rectifier; and
    sets of current harmonics corresponding to the first set of three bridge rectifiers and the second set of three bridge rectifiers are different than each other.

7. The modular AC to DC converter system of claim 6, wherein:
    a first plurality of sets of current harmonics associated with the first set of three bridge rectifiers are combined in the wye transformer; and
    a second plurality of sets of current harmonics associated with the second set of three bridge rectifiers are combined in the delta transformer.

8. The modular AC to DC converter system of claim 1, wherein:
    secondary windings of the first set of secondary windings are isolated from each other;
    secondary windings of the second set of secondary windings are isolated from each other;
    bridge rectifiers of the first set of three bridge rectifiers are isolated from each other;
    bridge rectifiers of the second set of three bridge rectifiers are isolated from each other; and loads connected to at least one of the first set of three bridge rectifiers or the second set of three bridge rectifiers are isolated from each other.

9. The modular AC to DC converter system of claim 1, wherein:

secondary windings of the first set of secondary windings are galvanically isolated from each other;

secondary windings of the second set of secondary windings are galvanically isolated from each other;

bridge rectifiers of the first set of three bridge rectifiers are galvanically isolated from each other;

bridge rectifiers of the second set of three bridge rectifiers are galvanically isolated from each other; and loads connected to at least one of the first set of three bridge rectifiers or the second set of three bridge rectifiers are galvanically isolated from each other.

10. The modular AC to DC converter of claim 1, wherein:

each bridge rectifier of the first set of three bridge rectifiers is a three-phase bridge rectifier; and each bridge rectifier of the second set of three bridge rectifiers is a three-phase bridge rectifier.

* * * * *